Nov. 4, 1958

F. E. GUTH 2,859,334

LOUVERS

Filed Sept. 9, 1954

INVENTOR.
FREDERICK E. GUTH,
BY Bruninga and Sutherland,
ATTORNEYS

United States Patent Office 2,859,334
Patented Nov. 4, 1958

2,859,334
LOUVERS

Frederick E. Guth, Clayton, Mo., assignor to The Edwin F. Guth Company, St. Louis, Mo., a corporation of Missouri Application September 9, 1954, Serial No. 454,998

1 Claim. (Cl. 240—106)

This invention relates to light diffusors, and more particularly, to egg-crate louvers for fluorescent lighting fixtures.

It is generally recognized that one of the principal problems of the industry has been that of reducing the brightness of a fixture without undue sacrifice in efficiency. In some instances, the fixture is covered with translucent or convoluted transparent sheet material, but this type of diffusor tends to be relatively inefficient or excessively bright. In other cases, an open egg-crate louver is employed in order to achieve relatively low brightness when viewed from an oblique angle, but necessarily some of the light from the light source enters the louver at oblique angles and impinges upon the vanes thereof, the result being reduced efficiency and greater brightness. It is accordingly an object of this invention to provide an improved diffusing panel to be used in conjunction with a light fixture or as a suspended ceiling in the manner taught in the copending application of Edwin F. Guth, entitled Illumination Control, Serial No. 383,519, filed October 1, 1953, now Patent No. 2,803,741.

Briefly, the louver of this invention comprises an egg-crate grid, preferably formed of translucent plastic material, the individual cells of which are closed with lens-shaped elements of translucent, but preferably clear, transparent material. The lens-shaped elements may be glass or they may be of clear plastic material. In one embodiment of the invention, the lenses are embedded within the grid, as by integral molding. An alternative embodiment of the invention involves an arrangement wherein the lenses are affixed to a thin backing in rows to fit the spacing of the grid cells, the backing sheet being secured to one side of the grid. The lenses should be designed to direct the light through the grid (regardless of the angle of incidence with the diffusor) and minimize impingement of light against the walls of the grid. Such lenticular or prism control of the light in its passage through the grid serves to increase over-all efficiency (by minimizing boxing of light within the cells of the grid), provides for some diffusion (in transmission through the lenses), and reduces brightness (since less light strikes the grid).

Other features of the invention will be in part apparent from and in part pointed out in the following detail description taken in connection with the accompanying drawings, in which.

Figure 1:
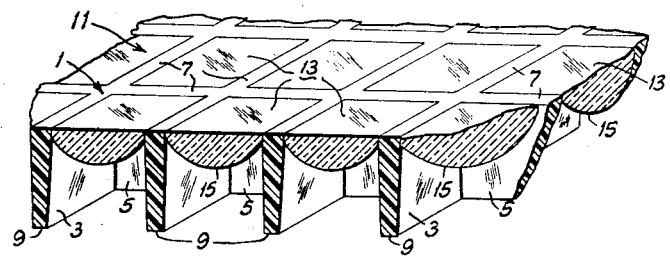
Fig. 1 is an oblique sectional view illustrating a light diffusor embodying features of this invention.

One of the principal objects of modern lighting practice is that of achieving more uniform distribution of light, so that the eyes do not have to adjust unnecessarily to different levels of illumination as the head is moved. In the case of ceiling fixtures of the direct type, the problem is one of reducing the amount of transmission at an angle from which the fixture might normally be viewed (glare zone) without otherwise interfering with the light transmission. A conventional exposed bulb necessarily transmits light equally in all directions, with the result that light transmitted directly to the eye is excessive when the working surface is adequately illuminated. Accordingly, it is customary to mount a diffusor beneath the bulbs to reduce the brightness of the light, which is to say, the diffusor provides for a greater proportion of the light being transmitted to the working surface and of a lesser proportion being transmitted to the eye or glare zone.

Several types of such diffusors have heretofore been employed, but it is thought that none of these devices offers the optimum in brightness reduction.

Although a flat-surfaced translucent panel has good efficiency, its ability to reduce brightness is definitely limited by its area and transmitting properties. In other words, the amount of light issuing from such a panel at an oblique angle bears a definite relationship to the amount of light directed downwardly, hence the brightness to the eye cannot be reduced without similarly reducing the illumination of the working surface and thereby lessening efficiency.

Such a translucent panel is less bright if one surface is formed with a ribbed or prismatic pattern. In comparison with a flat plate of translucent material, a prismatic panel is designed to direct a greater proportion of the light downwardly and to reduce the amount of light in the glare zone. Although a prismatic panel has no theoretical limit in the amount of brightness reduction, there is a definite practical limit because of the nature of the light source above the panel and imperfections in the lenses. Prismatic control of light requires point sources of light precisely located with respect to the prisms or lenses, and conventional light bulbs and reflectors do not provide for such a concentration. A prismatic panel does provide high efficiency, however, especially when made of clear glass, although such a clear panel is generally thought to have excessive brightness.

Finally, there is the open louver or egg-crate type of diffusor, the vanes of which are designed for a particular cut-off angle such that light does not pass directly from the bulbs to the eye, although light may be transmitted indirectly by reflection from the vanes to the glare zone. Here, again, there is no theoretical limit to the possibility of reducing brightness, inasmuch as the louver could be formed with vanes of material that is non-reflecting and non-transmitting. As a practical matter, however, such a theoretical louver would be excessively inefficient because of light absorption at the vanes; hence it is customary to employ highly-reflective aluminum or white vanes, and more recently, to form the vanes of translucent material, such as plastic, thereby achieving high efficiency. It may also be noted that the light passing directly through the grid is unidirectional, hence a reduction in the diffused reflection from or transmission through the vanes necessarily tends to aggravate shadows on the working surface.

With the diffuser disclosed herein, one is able to reduce brightness in comparison with a conventional open egg-crate louver without significant loss in efficiency and without significant increase in the amount of unidirectional light. In other words, an attempt to reduce the brightness of a louver by darkening the vanes thereof results in loss of efficiency by absorption at the vane and also in a condition wherein an increased proportion of the light transmitted is of a unidirectional type which tends to cast objectionable shadows. According to the present invention, an egg-crate grid is utilized, but lenses are mounted over the cells of the grid so as to refract the light as it enters the grid.

Figure 6:
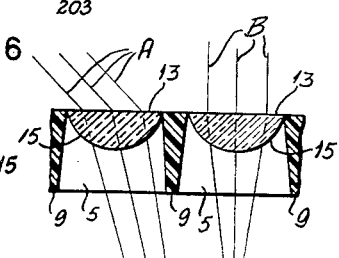
Fig. 6 is a diagrammatic view illustrating principles of the invention.

Referring to Fig. 6, it will be apparent that those light rays (indicated by lines A) which would enter the grid at an angle such as to be reflected by the vanes are refracted downwardly clear of the vanes, thereby improving the light transmission in the non-glare zone. By the same token, light reflection from the vanes into the glare zone is reduced, inasmuch as less light strikes the vanes. With respect to light entering the grid at an angle, as indicated at A, this condition would seem to produce an objectionable increase in the amount of unidirectional light, but the lenses also serve to counteract this effect with respect to light approaching in a normal direction, as indicated at B. In a conventional louver, this light would pass directly through the grid, whereas in the present instance, the lenses serve to refract the rays in different directions, as indicated at B, thereby providing for relatively diffused illumination of the working surface.

Referring now to the drawings, a diffuser embodying the present invention comprises an egg-crate grid 1, in which the apertures formed by walls 3 and 5 are substantially cubic. Preferably, these walls taper slightly from the top surfaces 7 to the bottom surfaces 9, and they are formed of translucent material in integrally-joined relationship. In a commercial embodiment, the walls have a thickness of the order of one-sixteenth inch and the height of the walls is approximately three-eighths inch. Where a forty-five degree cut-off is desired, the cubic or square openings are three-eighths inch wide. Such a grid is readily formed by molding a translucent resin or other plastic material, suitable substances being polystyrene, vinyl and acrylate resin. Conventional molding techniques may be employed to form grids of varying size, one size which is standard in the lighting industry being ten and one-half inches by forty-eight inches.

While an open grid of this type may be employed as a diffuser in a lighting fixture or in the construction of an illuminated ceiling improved results are achieved by mounting a plurality of lenses 11 over, and preferably within, the cells defined by the walls 3 and 5. The lenses 11 preferably are thin in comparison with the over-all thickness or height of the louver, and they should also be of a lenticular or prismatic cross-sectional shape.

Figure 2:
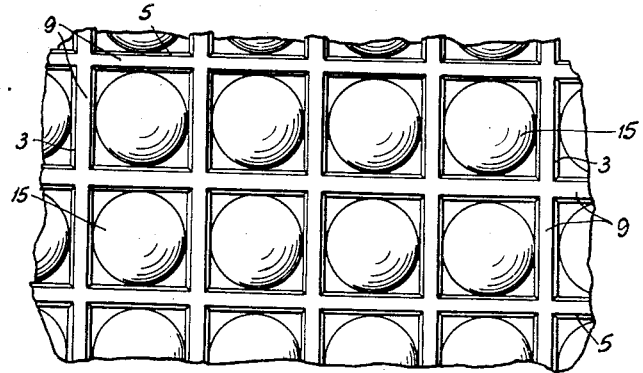
Fig. 2 is a bottom plan view of the louver shown in Fig. 1.
Figure 3:
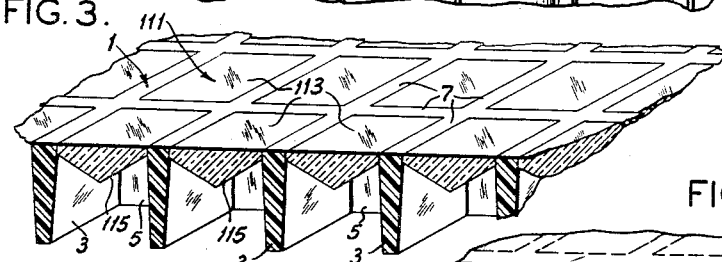
Fig. 3 is a view similar to that in Fig. 1, but illustrating an alternative embodiment of the invention.
Figure 4:
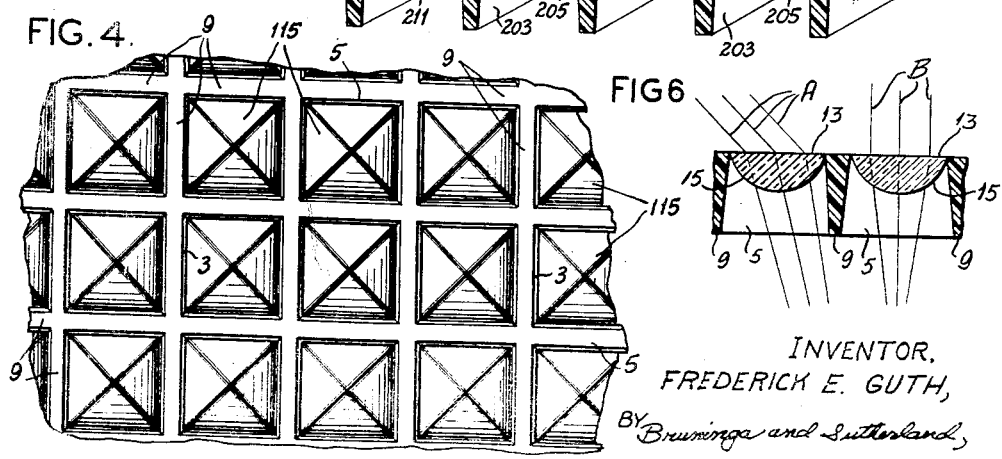
Fig. 4 is a bottom plan view of the louver shown in Fig. 3.

For example, in Figs. 1 and 2, the lenses 11 are shown to be of a simple convex type, the flat faces 13 thereof lying coplanar with the top surface 7 of the grid and the convex faces 15 thereof projecting within the cells. Various other shapes may be employed, however, and Figs. 3 and 4 illustrate prismatic lenses 111, the flat upper faces 113 of which lie flat with the top of the grid and the lower faces 115 of which project as four-sided pyramids within the cells. The corners of the faces 115 preferably are rounded slightly.

Normally, the lenses 11 and 111 would be formed of clear transparent material, such as glass or one of the resins above mentioned, whereas the grid is formed of a relatively translucent, "milky" material, this relationship combining maximum efficiency with low brightness. If desired, however, the lenses may also be of translucent material, but they should be somewhat more nearly transparent than the grid 1.

Figure 5:
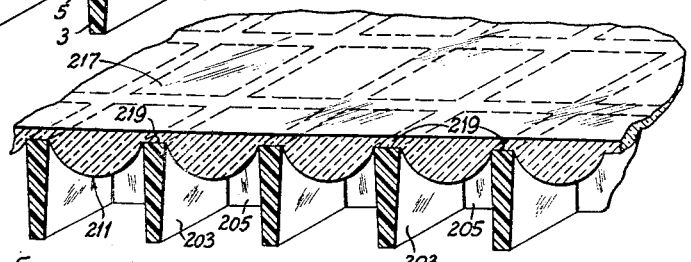
Fig. 5 is a view similar to that of Fig. 1, but illustrating a further embodiment of the invention.

In constructing a diffuser of the type described, the lenses are marginally embedded within the grid. The grid might be molded about a plurality of suitably-spaced prefabricated lenses, or conversely, the lenses may be molded within a prefabricated grid. Referring to Fig. 5, there is shown an alternative procedure wherein the lens-like protuberances 211 are formed upon an otherwise thin, flat sheet 217. The protuberances 211 are suitably spaced from one another at 219 and are arranged in rows for correlation with the cells formed by the grid walls 203 and 205, when the backing sheet 217 is placed upon one side of the grid. Various other procedures will suggest themselves to those skilled in the art.

In operation, the egg-crate grid 1 functions in the usual manner to provide low brightness to the eye, the vanes serving to cut off direct light at an angle of forty-five degrees. The lens-like elements over the grid improve efficiency and further reduce brightness in the glare zone by refraction of light away from the walls of the grid, and to some extent reduce the unidirectional quality of the light, at least as to that which would otherwise pass directly through the grid. Where the lenses are formed of clear, transparent material, there is very little loss in efficiency as compared with an open louver. The arrangement also provides a louver having a flat upper surface, from which dust may be readily removed.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. It is to be realized that many modifications and variations will present themselves to those skilled in the art without departing from the spirit of this invention or the scope thereof as set forth in the appended claim.

Having thus described the invention, what is claimed and desired to be secured by Letters Patent is:

A light diffuser adapted to be mounted beneath ceiling lamps comprising an egg-crate grid formed of translucent plastic material, the grid having generally cubic openings on the order of 3/8 inch square, and a series of relatively transparent lenticular elements secured to the grid, each grid opening having an individual lenticular element partially projecting therein, one side of the grid being coplanar with the adjacent faces of the lenticular elements, the other faces of the lenticular elements being shaped to refract light entering at said flat surface in a manner such as to reduce the amount of light incidence against the surfaces of the grid, thereby reducing the brightness of the grid.

References Cited in the file of this patent

UNITED STATES PATENTS

| | | |
|---|---|---|
| 436,085 | Mark | Sept. 9, 1890 |
| 1,610,481 | Sippel | Dec. 14, 1926 |
| 1,827,651 | Hacheney | Oct. 13, 1931 |
| 2,086,388 | Nechin | July 6, 1937 |
| 2,223,841 | Biller | Dec. 3, 1940 |
| 2,242,872 | Rolph | May 20, 1941 |
| 2,398,624 | Decker | Apr. 16, 1946 |
| 2,506,951 | Doane | May 9, 1950 |